(12) United States Patent
Kaneda et al.

(10) Patent No.: US 11,550,442 B2
(45) Date of Patent: Jan. 10, 2023

(54) ELECTRONIC PEN

(71) Applicant: Wacom Co., Ltd., Saitama (JP)

(72) Inventors: Takenori Kaneda, Saitama (JP); Mamoru Ogata, Saitama (JP); Kenichi Ninomiya, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/472,505

(22) Filed: Sep. 10, 2021

(65) Prior Publication Data
US 2021/0405786 A1 Dec. 30, 2021

Related U.S. Application Data

(63) Continuation of application No. PCT/JP2020/004070, filed on Feb. 4, 2020.

(30) Foreign Application Priority Data

Mar. 22, 2019 (JP) ............... JP2019-055046

(51) Int. Cl.
*G06F 3/046* (2006.01)
*B43K 29/00* (2006.01)
(Continued)

(52) U.S. Cl.
CPC .............. *G06F 3/046* (2013.01); *B43K 19/18* (2013.01); *B43K 29/00* (2013.01); *B43K 29/08* (2013.01);
(Continued)

(58) Field of Classification Search
CPC . G06F 3/03; G06F 3/044; G06F 3/046; G06F 3/03545; G06F 3/0442;
(Continued)

(56) References Cited

U.S. PATENT DOCUMENTS 602,355 A * 4/1898 Painter
3,262,904 A * 7/1966 Ripley ............... C08K 3/04
524/495

(Continued)

FOREIGN PATENT DOCUMENTS

| JP | 2007-219723 A | 8/2007 |
|---|---|---|
| WO | 2016/006030 | 1/2016 |
| WO | 2016/167264 | 10/2016 |

OTHER PUBLICATIONS

International Search Report, dated Mar. 31, 2020, for International Application No. PCT/JP2020/004070, 5 pages (with English Translation).

*Primary Examiner* — Patrick N Edouard
*Assistant Examiner* — Joseph P Fox
(74) *Attorney, Agent, or Firm* — Seed IP Law Group LLP

(57) ABSTRACT

Provided is an electronic pen with a cylindrical housing including an opening at an end portion of the housing on a pen tip side of the housing, a cylindrical member disposed in the housing and fixed to the housing at a part on the pen tip side of the housing, and a core body formed in a rod shape by a material containing a pigment, the core body including a body portion inserted into the cylindrical member through the opening of the housing and a pull-out portion configured to enable the core body to be pulled out of the housing. A diameter of the body portion of the core body inserted into the cylindrical member is larger than a difference between an outer diameter of the cylindrical member and an inner diameter of the cylindrical member.

14 Claims, 3 Drawing Sheets

(51) Int. Cl.
  *G06F 3/0354* (2013.01)
  *B43K 19/18* (2006.01)
  *B43K 29/08* (2006.01)
  *G06F 3/044* (2006.01)

(52) U.S. Cl.
  CPC ........ *G06F 3/03545* (2013.01); *G06F 3/0442* (2019.05); *G06F 2203/04105* (2013.01)

(58) Field of Classification Search
  CPC ............ G06F 2203/04105; B41J 2/175; B43K 29/00; B43K 19/18; B43K 29/08
  See application file for complete search history.

(56) References Cited

U.S. PATENT DOCUMENTS

| | | |
|---|---|---|
| 2017/0102792 A1 | 4/2017 | Aoki et al. |
| 2018/0011560 A1 | 1/2018 | Kamiyama et al. |

* cited by examiner

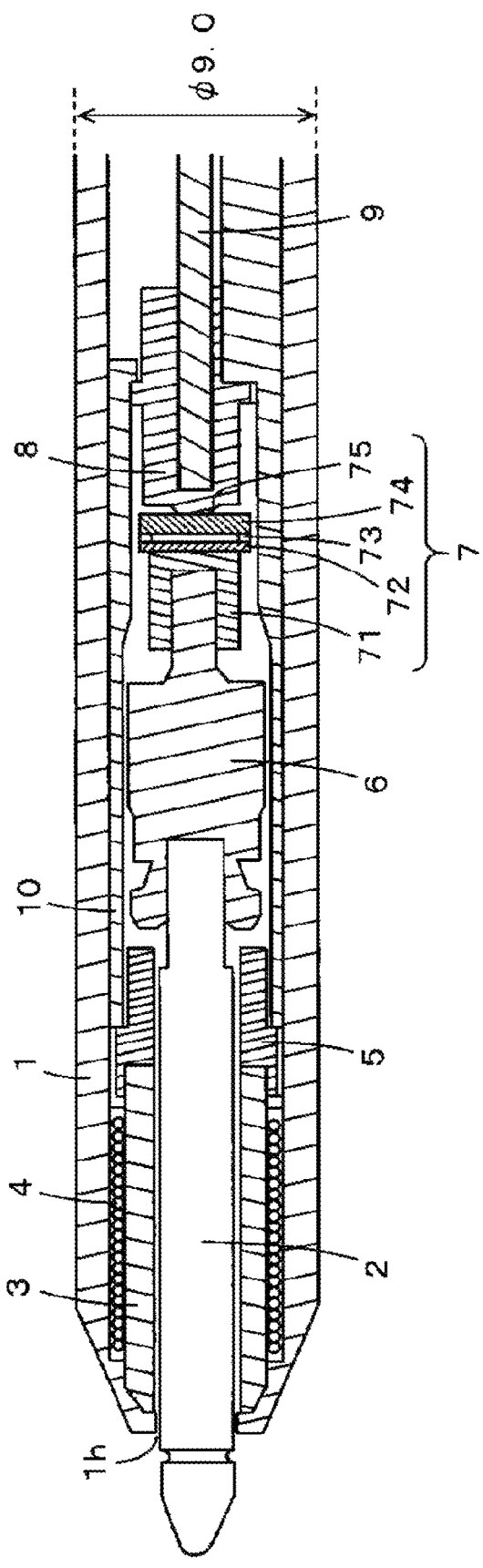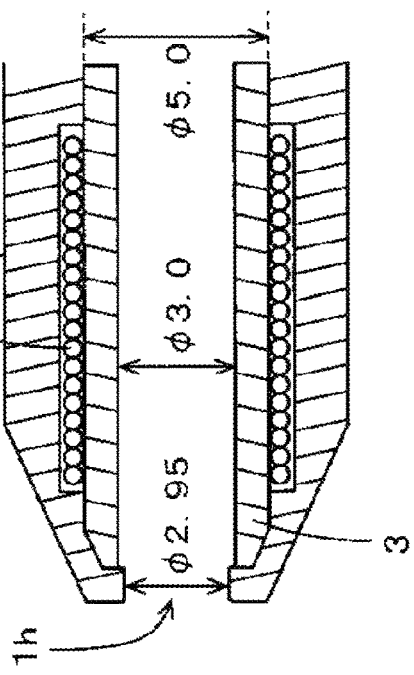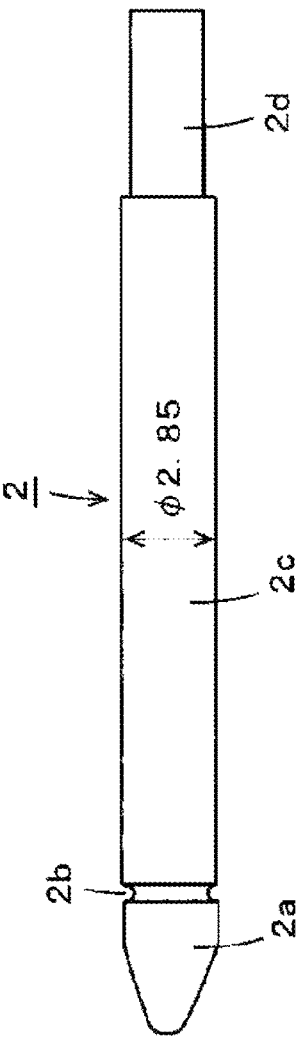

ELECTRONIC PEN

BACKGROUND

Technical Field

This disclosure relates to an electronic pen that realizes a function of a position indicator for an electronic apparatus, such as a tablet personal computer (PC), provided with a position detection device.

Background Art

In recent years, electronic pens and tablet PCs have also started being used in the field of education. For example, an electronic pen and a tablet PC are lent to each child or student to teach the stroke order of kanji through input of a character or to obtain an answer for a question. The use of the electronic pen to input information to the tablet PC is convenient because information can be repeatedly input without using a paper medium. The electronic pen includes a core body formed by, for example, a polyacetal (POM) resin and is relatively hard to break.

FIGS. 3A and 3B depict conventional examples of the electronic pen. Electronic pens 100 and 200 illustrated in FIGS. 3A and 3B are, for example, electromagnetic resonance (EMR) electronic pens. Constituent parts including coils 104 and 204 wound around outer surfaces of ferrite cores 103 and 203 are provided in housings 101 and 201. Capacitors not illustrated are connected to the coils 104 and 204 to form resonant circuits. Core bodies 102 and 202 are inserted into through holes of the ferrite cores 103 and 203 from openings of the housings 101 and 201 and abut against pen pressure detectors 105 and 205, and the pen pressure applied to the core bodies 102 and 202 can be detected.

The electronic pen can be used to easily and repeatedly input and rewrite information to the tablet PC, unlike in the writing on a paper medium. Switching the display screen is also easy. The display screen can be instantly switched, and the input information can be deleted. Therefore, to hold the input information, an operation of saving the input information in a built-in storage medium needs to be performed. There is also a demand for using not only the electronic pen and the tablet PC, but also a paper medium, such as a notebook, in learning. Consequently, it is required to be able to record the information on the paper medium and also input the information to the tablet PC, without releasing or holding again the electronic pen.

An electronic pen including a mechanical pencil unit is disclosed in Japanese Patent Laid-Open No. 2007-219723 (hereinafter, referred to as Patent Document 1), and the invention disclosed in Patent Document 1 can be used to realize an electronic pen having both the function of writing information on a paper medium and the function of inputting information to a tablet PC. The electronic pen can be used to record necessary information on the paper medium or to input an answer to a problem into the tablet PC to immediately answer the problem.

In the electronic pen including the mechanical pencil unit disclosed in Patent Document 1, the lead of the mechanical pencil is usually thin, which is approximately 0.5 mm, and the pen tip of the electronic pen is also thin. Therefore, when children in lower grades of elementary schools use the electronic pens, it is difficult to apply a right amount of pressure. In this case, the lead of the mechanical pencil is easily broken, so that information may not be written on the paper medium as intended, or an operation screen of the tablet PC may be scratched.

Considering the use of the electronic pen in the field of education, particularly, considering that children in lower grades of elementary schools use the electronic pens, it is desirable to realize an electronic pen that can be used similarly to the conventional electronic pens configured as in FIGS. 3A and 3B and that can also record information on the paper medium. In addition, the electronic pen may be frequently dropped or hit. Therefore, the electronic pen needs to be resistant to impact applied from outside and needs to be hard to break.

BRIEF SUMMARY

In view of the above, this disclosure provides an electronic pen that has both a function of writing information on a paper medium or the like and a function of a position indicator for an electronic apparatus and that is also resistant to impact.

To solve the problem, provided is an electronic pen with a cylindrical housing including an opening at an end portion of the housing on a pen tip side, of the housing a cylindrical member disposed in the housing and fixed to the housing on the pen tip side of the housing, and a core body formed in a rod shape by a material containing a pigment, the core body including a body portion inserted into the cylindrical member through the opening of the housing and a pull-out portion configured to enable the core body to be pulled out of the housing. A diameter of the body portion of the core body inserted into the cylindrical member is larger than a difference between an outer diameter of the cylindrical member and an inner diameter of the cylindrical member.

According to the electronic pen, the cylindrical member is fixed to the housing on the pen tip side in the housing. Therefore, there is no rattling caused by external impact (force), and the electronic pen is protected from damage. The core body is formed in a rod shape by a material containing a pigment, and therefore, handwriting can be physically left on a paper medium or the like. That is, the electronic pen has both a function of writing information on a paper medium or the like and a function of a position indicator used for an electronic apparatus.

The diameter of body portion of the core body inserted into the cylindrical member is larger than the thickness of the cylindrical member in a diameter direction. More specifically, the thickness of the cylindrical member is further reduced, and this can increase the diameter of the core body. Therefore, the core body is thicker and less likely to break. This can also ensure the strength of the core body in addition to the cylindrical member. The core body includes the pull-out portion. Therefore, the core body can not only be easily installed in the housing, but can also be easily pulled out from the housing. That is, the core body can be easily exchanged.

BRIEF DESCRIPTION OF THE DRAWINGS

FIGS. 1A to 1C are diagrams for describing an electronic pen according to an embodiment of this disclosure;

DETAILED DESCRIPTION

Figure 2A:
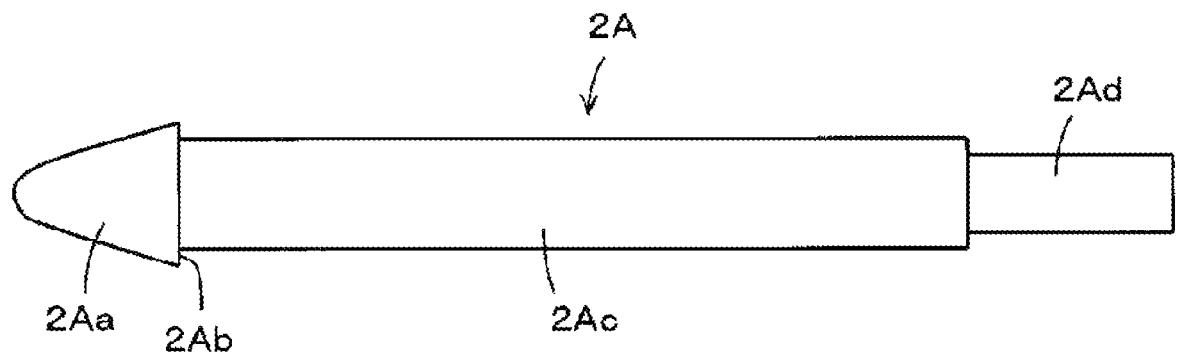
FIGS. 2A and 2B are diagrams for describing another example of an electronic pen according to an embodiment of this disclosure.

An embodiment of an electronic pen of this disclosure will now be described with reference to the drawings. Note that examples of a system of the electronic pen (position indicator) and a position detection device include an EMR system and an active capacitive coupling (active electrostatic (AES)) system.

In the EMR system, the position detection device includes a sensor unit including a plurality of loop coils arranged in an X-axis direction and a Y-axis direction. A transmission period for sequentially supplying power to the plurality of loop coils of the sensor unit to generate a magnetic field and a reception period for stopping the supply of power to receive a magnetic field from the outside are alternately set. The corresponding electronic pen includes a resonant circuit including a coil and a capacitor. A current flows through the coil, according to the magnetic field from the sensor unit, and a signal is generated. The electronic pen includes pen pressure information in the signal and transmits the signal to a position detection sensor. The position detection device receives the signal in the reception period to detect the instruction position of the electronic pen and the pen pressure.

In the active capacitive coupling system, the electronic pen includes the pen pressure information in the signal from the resonant circuit mounted on the electronic pen and transmits the signal. The position detection device receives the signal to detect the instruction position and the pen pressure.

The electronic pen of this disclosure can be used in the EMR system and the active capacitive coupling system. In an example of the embodiment described below, this disclosure is applied to an EMR electronic pen to simplify the description.

[Configuration Example of Electronic Pen]

FIGS. 1A to 1C are diagrams for describing an electronic pen according to an embodiment of this disclosure. FIG. 1A is a cross-sectional view of a pen tip part illustrated by dividing the electronic pen of this embodiment into two parts in an axial direction and removing a front part. However, instead of a cross section of a core body 2, the entire core body 2 is illustrated in FIG. 1A. FIG. 1B is an enlarged view of the core body 2, and FIG. 1C is an enlarged cross-sectional view of the pen tip part of FIG. 1A.

As illustrated in FIG. 1A, a housing 1 of the electronic pen of this embodiment is cylindrical. As illustrated in FIGS. 1A and 1C, a pen tip side of the housing 1 is tapered, and a tip portion includes an opening 1h. The core body 2 described later is inserted and removed through the opening 1h. A ferrite core 3 formed in a cylindrical shape is housed in a part on the pen tip side in the housing 1. An end portion part on the pen tip side (front end side) of the ferrite core 3 is fixed to the housing 1. A cylindrical cushion member 5 formed by, for example, elastomer is provided on the opposite side (back end side) of the pen tip side of the ferrite core 3. An end portion part on the back end side of the ferrite core 3 is fixed to the housing 1 through the cushion member 5.

In this way, the ferrite core 3 is fixed to the housing 1 at both end parts on the front end side and the back end side of the ferrite core 3. Although the cushion member 5 is provided only on the back end side of the ferrite core 3 in FIG. 1A, a cushion member may also be provided on the front end side of the ferrite core 3. In short, the ferrite core 3 can be fixed to the housing 1 directly or through an inclusion, such as a cushion member, to prevent the ferrite core 3 from moving or rattling in the housing 1. Note that the cushion member 5 can be formed by various elastic materials, such as rubber, sponge, and felt.

As illustrated in FIGS. 1A and 1C, a coil 4 is wound around an outer surface of the ferrite core 3. Capacitors (not illustrated) mounted on a pen pressure detector 7 with a configuration of variable capacitors described later and capacitors mounted on a circuit board 9 are connected in parallel to the coil 4, and a resonant circuit is formed. A pressing member 6 for connecting the core body 2 and the pen pressure detector 7 is provided on the back end side of the cushion member 5. An end portion part on the pen tip side of the pressing member 6 includes a recessed portion fitted with the back end side of the core body 2, and an end portion part on the opposite side of the pen tip side includes a projected portion for pressing the pen pressure detector 7.

The core body 2 is formed in a columnar shape (rod shape) by a material containing a pigment. The pigment is powder used for coloring and is insoluble in water or oil. Examples of the pigment include inorganic pigments, such as graphite (black), titanium (white), chrome vermillion (vermillion), chrome yellow (yellow), and iron oxide (red), and organic pigments, such as permanent red (red), phthalocyanine green (green), and fast yellow (yellow). There are various other pigments. Pigments and media, such as resin, clay, and wax, can be mixed to provide core bodies of various colors. This can provide the core body 2 that can leave handwriting of the intended color on a paper medium or the like according to the used pigment.

In this embodiment, graphite (black lead, plumbago) is used as a pigment, and the pigment is mixed with a predetermined resin to provide the core body 2. The core body 2 can leave black handwriting similar to that of a pencil on a paper medium or the like, and the core body 2 does not wear out much. The hardness of the core body 2 is also approximately the same as the core body formed by a POM resin in a conventional electronic pen. Therefore, when the electronic pen provided with the core body 2 is used on an operation surface of the tablet PC, the core body 2 does not cause an inconvenience such as scratching of the operation surface. The core body 2 described above can be used to realize an electronic pen having two functions including the function of writing information on a paper medium or the like and the function of a position indicator for a tablet PC or the like. Note that, in this embodiment, the ratio of the graphite to the resin included in the core body 2 is 50:50. The resin is polyethylene.

As illustrated in FIG. 1B, the core body 2 includes four parts including a pen tip portion 2a, a pull-out portion 2b, a body portion 2c, and a hold portion 2d. The pen tip portion 2a is a tapered part, and the tip of the pen tip portion 2a is roundish. The pull-out portion 2b is a recessed portion (groove portion) provided between the pen tip portion 2a and the body portion 2c. To remove the core body 2 attached in the housing 1, a user can hook a fingernail or the like onto the pull-out portion 2b and pull out the pull-out portion 2b to easily remove the core body 2 from the housing 1. The body portion 2c is a part positioned between the pull-out portion 2b and the hold portion 2d. The hold portion 2d is a part positioned on the back end side of the body portion 2c, and the diameter of the hold portion 2d is shorter than the diameter of the body portion 2c.

As illustrated in FIG. 1A, the core body 2 is inserted into the ferrite core 3 through the opening 1h of the housing 1, and the hold portion 2d of the core body 2 is fitted to the recessed portion of the pressing member 6 to attach the core body 2 in the housing 1. In this case, the tip part including the pull-out portion 2b of the core body 2 protrudes from the opening 1*h* of the housing 1. The pen pressure detector 7 includes a holding member 71 that holds the projected portion of the pressing member 6, a first electrode 72, a spacer 73 formed in a ring shape, a dielectric 74 that is a circular plate-shape body, and a second electrode 75. The second electrode 75 is in contact with one surface of the dielectric. The first electrode 72 is separated from the other surface of the dielectric 74 through the spacer 73 when pressing force (load) is not applied to the first electrode 72. Note that the holding member 71 is formed by an elastic material, such as synthetic rubber, and the spacer 73 is formed by a hard resin or the like.

The core body 2 attached in the housing 1 can be moved in the axial direction. When pen pressure is applied to the pen tip portion 2*a* of the core body 2, the core body 2 is pushed into the housing 1 according to the pen pressure. In response to this, the pressing member 6 brings the first electrode 72 closer to the dielectric 74 through the holding member 71 to bring the first electrode 72 into contact with the dielectric 74. Therefore, the distance and the contact area between the first electrode 72 and the dielectric 74 varies according to the pressing force applied to the pen tip portion 2*a*, and the capacitance between the first electrode 72 and the second electrode 75 varies accordingly. The pen pressure applied to the pen tip portion 2*a* of the core body 2 can be detected according to the variation in capacitance between the first electrode 72 and the second electrode 75. When the pen pressure applied to the pen tip portion 2*a* of the core body 2 is released, the core body 2 is pushed backed by the first electrode 72 and the holding member 71 and returns to the original position.

A board holding member 8 is provided on a back stage of the second electrode 75 of the pen pressure detector 7, and the circuit board 9 is fitted and held by a recessed portion of the board holding member 8. Various circuit components, such as a control integrated circuit (IC) and a capacitor, are mounted on the circuit board 9. Transmission wires from both ends of the coil 4 and from the first electrode 72 and the second electrode 75 of the pen pressure detector 7 are connected to the circuit board 9. In this way, the function of a circuit unit mounted on the circuit board 9 can detect the pen pressure. In addition, the information indicating the pen pressure can be included in the signal as a change in phase of the signal (magnetic field) generated by the resonance in the coil 4, and the signal can be transmitted.

The cushion member 5 and the board holding member 8 described above are held by a cylindrical holding member 10 provided inside of the housing 1. Therefore, the ferrite core 3, the coil 4, the cushion member 5, the pressing member 6, the pen pressure detector 7, and the board holding member 8 are held in the housing 1. Although not illustrated, the back end side of the circuit board 9 is fixed to the back end portion of the housing 1. Therefore, the circuit board 9 is also held in the housing 1. The electronic pen of this embodiment is configured in this way.

In the electronic pen of this embodiment, the diameter of the housing 1 is 9.0 mm as illustrated in FIG. 1A. The inner diameter of the ferrite core 3 is 3.0 mm, and the outer diameter is 5.0 mm as illustrated in FIG. 1C. The diameter of the opening 1*h* of the housing 1 is 2.95 mm. The diameter of the body portion 2*c* of the core body 2 is 2.85 mm. In the conventional electronic pen, a high-strength material, such as a POM resin, is used to create the core body. To also maintain the strength of the ferrite core, the sum of the thicknesses at both ends of the ferrite core in the diameter direction is larger than the diameter of the core body as also illustrated in FIGS. 3A and 3B.

Figure 3A:
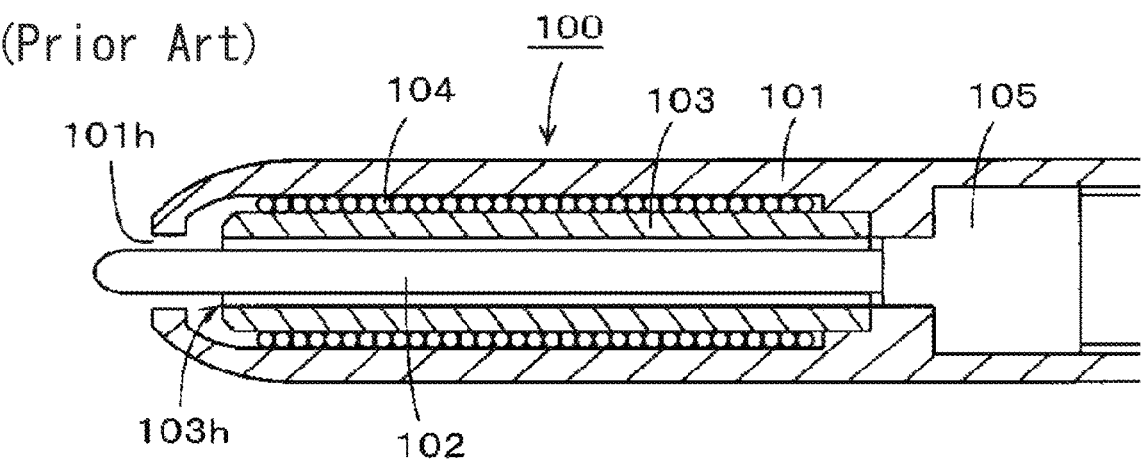
FIGS. 3A and 3B depict configuration examples of conventional electronic pens.
Figure 3B:
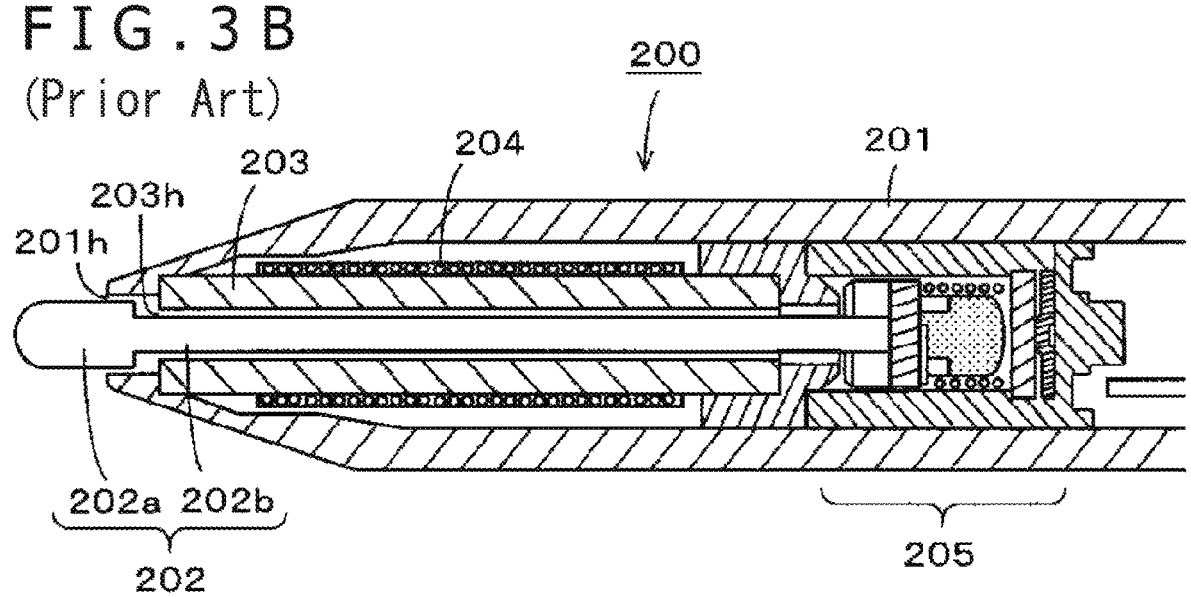

As illustrated in FIG. 3A, the diameter of an opening 101*h* of the housing 101 is larger than the diameter of a through hole 103*h* of the ferrite core 103 (inner diameter of the ferrite core 103) in the conventional electronic pen 100. Similarly, as illustrated in FIG. 3B, the diameter of an opening 201*h* of the housing 201 is larger than the diameter of a through hole 203*h* of the ferrite core 203 (inner diameter of the ferrite core 203) in the conventional electronic pen 200.

This is so as not to interfere with the movement of the core bodies 102 and 202 in the axial direction. In this case, the thicknesses of the ferrite cores 103 and 203 are thick. Therefore, even if the core bodies 102 and 202 come into contact with the ferrite cores 103 and 203, both are not damaged, and the degree of freedom in design is high. As a result, the diameters of the openings 101*h* and 201*h* of the housings 101 and 201 can be increased.

However, in the electronic pen of this embodiment, the sum of the thicknesses at both ends of the ferrite core 3 in the diameter direction is 2.0 mm, and the diameter of the body portion 2*c* of the core body 2 is 2.85 mm. That is, the diameter of the core body 2 in the electronic pen of this embodiment is thicker than that of the conventional electronic pen, and the thickness of the ferrite core 3 is thinner than that of the conventional electronic pen. Therefore, the diameter of the body portion 2*c* of the core body 2 is longer than the length of the difference between the outer diameter and the inner diameter of the ferrite core 3 in the electronic pen of this embodiment.

In this way, the diameter of the body portion 2*c* of the core body 2 can be increased to increase the strength of the core body 2. On the other hand, the thickness of the ferrite core 3 is much thinner than that of the conventional electronic pen. However, the ferrite core 3 is fixed to the housing 1. Therefore, the ferrite core 3 does not move or rattle in the housing 1. As illustrated in FIGS. 1A and 1C, the diameter of the opening 1*h* of the housing 1 is smaller than the inner diameter of the ferrite core 3. Therefore, when the electronic pen of this embodiment is used for writing, the position of the core body 2 is regulated by the inner wall part of the opening 1*h* of the housing 1, and the core body 2 does not come into contact with the ferrite core 3.

It is assumed that a large load (force) in a direction intersecting the axial direction is applied to the pen tip portion 2*a* of the core body 2 protruding from the housing 1 due to a fall or the like of the electronic pen of this embodiment. In this case, the position of the core body 2 is also regulated by the inner wall part of the opening 1*h* of the housing 1, and the core body 2 does not come into contact with the ferrite core 3. Therefore, in the electronic pen of this embodiment, the ferrite core 3 is not brought into contact with the core body 2 and damaged. Further, the ferrite core 3 does not move or rattle in the housing 1, and therefore, the ferrite core 3 is not damaged by external impact.

[Another Example of Core Body 2]

Figure 2B:
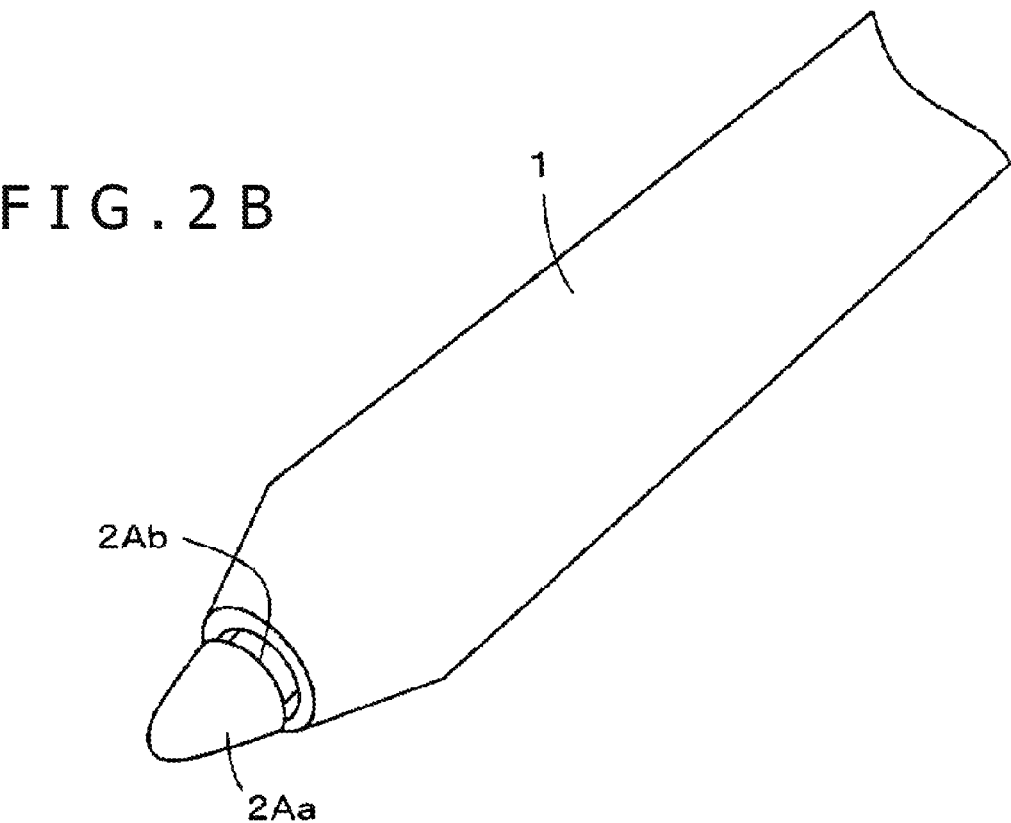

FIGS. 2A and 2B are diagrams for describing another example of the core body of the electronic pen of this disclosure. A core body 2A of the electronic pen in this example is formed in a columnar shape by a resin containing graphite similarly to the core body 2 illustrated in FIGS. 1A to 1C. However, the external shape of the core body 2A is different from the external shape of the core body 2 illustrated in FIGS. 1A to 1C. More specifically, the core body 2A of this example includes four parts including a pen tip portion 2Aa, a pull-out portion 2Ab, a body portion 2Ac, and a hold portion 2Ad as illustrated in FIG. 2A.

The pen tip portion 2Aa is a tapered part, and the tip of the pen tip portion 2Aa is roundish. The pull-out portion 2Ab is a part in which the body portion 2Ac side of the pen tip portion 2Aa is a projected portion projecting outside. The body portion 2Ac is a part positioned between the pull-out portion 2Ab and the hold portion 2Ad. The hold portion 2Ad is a part positioned on the back end side of the body portion 2Ac, and the diameter of the hold portion 2Ad is shorter than the diameter of the body portion 2Ac.

In this way, when the core body 2A including the pull-out portion 2Ab as a projected portion is attached in the housing 1, there is a gap between the end portion of the housing 1 and the pull-out portion 2Ab of the core body 2A as illustrated in FIG. 2B. Therefore, to remove the core body 2A attached in the housing 1, the user can hook a fingernail or the like onto the pull-out portion 2Ab and pull out the pull-out portion 2Ab to easily remove the core body 2A from the housing 1.

Note that the electronic pen can be configured as illustrated in FIG. 2B just by using the core body 2A illustrated in FIG. 2A in place of the core body 2 of the electronic pen described with reference to FIGS. 1A to 1C. More specifically, the electronic pen including the core body 2A in place of the core body 2 can be provided by setting the sizes of the body portion 2Ac and the hold portion 2Ad of the core body 2A similarly to the case of the core body 2 illustrated in FIGS. 1A to 1C.

Advantageous Effects of Embodiment

A resin containing a pigment, such as graphite, can be used for the core bodies 2 and 2A to physically leave handwriting on a paper medium or the like as in the case of a conventional pencil. The core bodies 2 and 2A including a resin containing a pigment, such as graphite, do not wear out much and also function as core bodies of electronic pens. This can realize a writing tool (electronic pen) having both the function of writing information on a paper medium or the like and the function of a position indicator for an electronic apparatus, such as a tablet PC, provided with a position detection device.

The diameter of the core body can be thicker than that of the conventional electronic pen, and this can realize an electronic pen with an impact-resistant core body. Conversely, when a core body with a thick diameter is used, the thickness of the ferrite core 3 is reduced, and the ferrite core 3 is sensitive to impact. However, the diameter of the opening 1h on the pen tip side of the housing 1 can be set to a diameter shorter than the inner diameter of the ferrite core 3 to prevent the core bodies 2 and 2A from coming into direct contact with the ferrite core 3. In addition, the ferrite core 3 can be fixed to the housing 1 at least at the end portion on the front end side, preferably, at both end portions on the front end side and the back end side, to prevent the ferrite core 3 from rattling in the housing 1. These configurations can realize an electronic pen in which the ferrite core 3 with a thin thickness is not damaged.

[Modifications]

The size of the diameter of the body portion 2c of the core body 2 and the sizes of the inner diameter and the external shape of the ferrite core 3 described with reference to FIGS. 1A and 1C are examples, and the sizes can be various sizes according to the size of the housing 1 and the like. In this case, the diameter of the body portion 2c of the core body 2 needs to be larger (longer) than the value (length) of the difference between the outer diameter and the inner diameter of the ferrite core 3. More specifically, the diameter of the body portion 2c of the core body 2 is set to a length longer than the sum of the thicknesses at both ends of the ferrite core 3 in the diameter direction. In this way, the core body 2 can be thicker than in the conventional electronic pen.

The core bodies 2 and 2A include a resin containing graphite in the embodiment described above. In this case, the amount of graphite can be adjusted to provide electronic pens with different densities of handwriting in writing information on the paper medium. More specifically, there are pencils with different densities, such as 2B, B HB, F, H, and 2H, and electronic pens with different densities of handwriting can also be realized.

The type of resin containing graphite can also be changed to adjust the density of handwriting or to change the feel of writing. Although the resin is polyethylene in the embodiment described above, other examples of the resin include polypropylene, polystyrene, and polyamide. Obviously, graphite and predetermined clay can be mixed and baked to form the core body. In the case of such a core body, the core body wears out and becomes short when information is written on the paper medium or the like. This increases the number of exchanges of the core body, and therefore, it is preferable to use a material that can reduce the wear of the resin or the like.

The used pigment can also be changed to provide core bodies that can leave handwriting of various colors, and these core bodies can be used as core bodies of electronic pens.

Although this disclosure is applied to the EMR electronic pen in the example of the embodiment described above, the application of this disclosure is not limited to this. For example, this disclosure can also be applied to an active capacitive coupling electronic pen. More specifically, this disclosure can also be applied to realize an active capacitive coupling electronic pen having the function of writing information on a paper medium and the function of a position indicator for an electronic apparatus.

Specifically, there is a case in which the active capacitive coupling electronic pen is provided with a coil for charging. In this case, a ferrite core can be arranged around the core body to prevent noise from entering the core body. This disclosure can be applied to such a case. Further, in a case where the active capacitive coupling electronic pen is driven by an exchangeable battery, a cylindrical member may be used instead of the ferrite core, to protect the core body or to allow the core body to steadily move in the axial direction. This disclosure can also be applied to such a case.

Note that the core body can be formed by a resin containing graphite, and a conductive material can be further added to provide a conductive core body. This can realize the active capacitive coupling electronic pen. That is, the core body used in the active capacitive coupling electronic pen needs to be conductive. Therefore, graphite or the like and a conductive material can be mixed into the core body, or a metal axis can be provided in the core body to form a core body with excellent conductivity.

It is to be noted that the embodiment of the present disclosure is not limited to the foregoing embodiments, and that various changes can be made without departing from the spirit of the present disclosure.

What is claimed is:
1. An electronic pen comprising:
  a cylindrical housing including an opening at an end portion of the housing on a pen tip side of the housing;
  a cylindrical member disposed in the housing and fixed to the housing on the pen tip side of the housing;

a core body formed in a rod shape by a material containing a pigment, the core body including a body portion inserted into the cylindrical member through the opening of the housing and a pull-out portion configured to enable the core body to be pulled out of the housing,
wherein a diameter of the body portion of the core body inserted into the cylindrical member is larger than a difference between an outer diameter of the cylindrical member and an inner diameter of the cylindrical member;
a pen pressure detector which, in operation, detects pen pressure applied to the core body; and
a pressing member that presses the pen pressure detector,
wherein an end of the core body on a side of the core body opposite a side of the core body on the pen tip side of the housing includes a hold portion with a diameter shorter than a diameter of the body portion, and
wherein the hold portion is fitted and fixed to the pressing member.

2. The electronic pen according to claim 1, wherein the inner diameter of the cylindrical member is larger than a diameter of the opening of the housing.

3. The electronic pen according to claim 1, wherein:
the cylindrical member includes a ferrite core, and
the electronic pen further comprises:
   a resonant circuit including a coil wound around an outer surface of the ferrite core and a capacitor connected to the coil, wherein the resonant circuit, in operation, causes the electronic pen to function as an electromagnetic resonance electronic pen.

4. The electronic pen according to claim 1, wherein the core body is formed by a resin containing graphite as the pigment.

5. The electronic pen according to claim 1, wherein the pull-out portion includes a recessed portion.

6. The electronic pen according to claim 1, wherein the pull-out portion includes a projected portion.

7. The electronic pen according to claim 1, wherein part of the core body on the pen tip side of the housing is tapered.

8. An electronic pen comprising:
a cylindrical housing including an opening at an end portion of the housing on a pen tip side of the housing;
a cylindrical member disposed in the housing and fixed to the housing on the pen tip side of the housing,
wherein the cylindrical member includes a ferrite core;
a core body formed in a rod shape by a material containing a pigment, the core body including a body portion inserted into the cylindrical member through the opening of the housing and a pull-out portion configured to enable the core body to be pulled out of the housing,
wherein a diameter of the body portion of the core body inserted into the cylindrical member is larger than a difference between an outer diameter of the cylindrical member and an inner diameter of the cylindrical member; and
a resonant circuit including a coil wound around an outer surface of the ferrite core and a capacitor connected to the coil, wherein the resonant circuit, in operation, causes the electronic pen to function as an electromagnetic resonance electronic pen.

9. The electronic pen according to claim 8, further comprising:
a pen pressure detector which, in operation, detects pen pressure applied to the core body; and
a pressing member that presses the pen pressure detector,
wherein an end of the core body on a side of the core body opposite a side of the core body on the pen tip side of the housing includes a hold portion with a diameter shorter than a diameter of the body portion, and
wherein the hold portion is fitted and fixed to the pressing member.

10. The electronic pen according to claim 8, wherein the inner diameter of the cylindrical member is larger than a diameter of the opening of the housing.

11. The electronic pen according to claim 8, wherein the core body is formed by a resin containing graphite as the pigment.

12. The electronic pen according to claim 8, wherein the pull-out portion includes a recessed portion.

13. The electronic pen according to claim 8, wherein the pull-out portion includes a projected portion.

14. The electronic pen according to claim 8, wherein part of the core body on the pen tip side of the housing is tapered.

* * * * *